Dec. 26, 1922.
J. WATTMANN.
WELDING METALS.
FILED MAY 8, 1922.
1,440,256
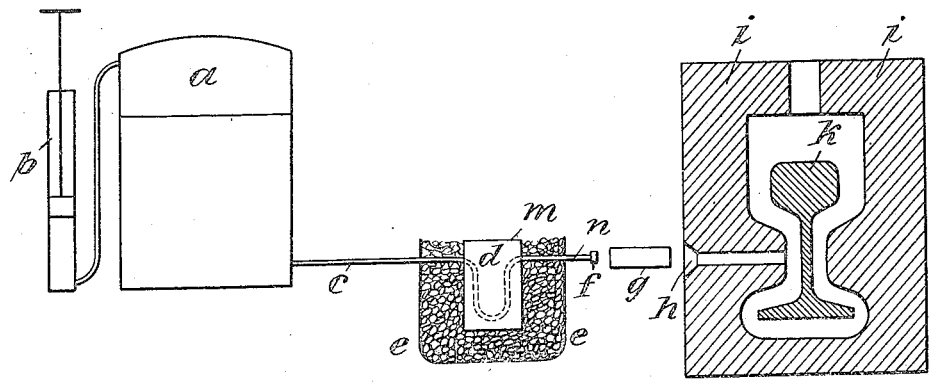
Inventor
John Wattmann
by [signature]
Attorney.

UNITED STATES PATENT OFFICE.

JOHN WATTMANN, OF BERLIN-LANKWITZ, GERMANY, ASSIGNOR TO THE FIRM: ELECTROTHERMIT GESELLSCHAFT MIT BESCHRÄNKTER HAFTUNG, OF BERLIN, GERMANY.

WELDING METALS.

Application filed May 8, 1922. Serial No. 559,372.

*To all whom it may concern:*

Be it known that I, JOHN WATTMANN, a citizen of Germany, residing at Berlin-Lankwitz, Germany, have invented certain new and useful Improvements in Welding Metals, of which the following is a specification.

My invention refers to the welding of metallic workpieces and more especially to improvements in the aluminothermic welding process. It is an object of my invention to render the welding of workpieces, more especially by way of the aluminothermic welding method, more economical and more efficient.

As is well known to those skilled in the art, larger workpieces have been heated for welding purposes by surrounding contiguous ends thereof with a mould of low heat conductivity and introducing into such mould highly heated gases which serve to heat the mould as well as the workpiece. This mode of proceeding involves the drawback that heating the gases by burning them outside the mould results in a very considerable loss of heat which is not utilized.

In order to heat the workpiece in a far more economical and efficient manner, I cause combustion of the gases to take place within the mould. This mode of proceeding has proved to be particularly advantageous in connection with the aluminothermic welding method inasmuch as by causing the gases to burn within the mould the workpiece is also preheated very efficiently, whereby as the mould is being used for aluminothermic casting, the quantity of aluminothermic mixture (thermite or the like) required is materially reduced.

In practicing this process I may use either gaseous or liquid or solid, preferably pulverulent fuel. In a preferred form of my improved method I use liquid fuel which has previously been converted into vapor by heating. The air of combustion may either be ordinary atmospheric air or air to which more or less oxygen has been admixed, or else pure oxygen may be used. Under certain circumstances it may prove useful to add coal dust. If it be desired to obtain very high temperatures of combustion, then the air of combustion may be preheated before mixing it with the gaseous fuel.

In the drawings affixed to this specification and forming part thereof apparatus adapted for the carrying out of my invention is illustrated diagrammatically by way of example.

In the drawings $a$ is a container partly filled with liquid fuel such as benzol or benzine under a pressure of at least 6 atmospheres, a compressor $b$ serving to force atmospheric air into the container $a$ above the liquid fuel. The fuel passes through a pipe $c$ into a vaporizing chamber $d$ of U-shape formed in a solid iron block $m$. This latter is placed in a basket $e$ filled with burning coal and is thus strongly heated. The iron block serves for storing the heat so as to warrant a uniform heating of the vaporizing chamber $d$. The vapours developed in this chamber pass through a short tube $n$ on to a nozzle $f$ where they escape at high speed and enter the mixing tube $g$, carrying along with them a large quantity of atmospheric air. The mixing tube $g$ is disposed in front of and distanced apart from the opening $h$ of the mould $i$ which partly surrounds the workpieces such as rails $k$.

As shown in the drawing the mixing tube does not extend into the opening $h$ but ends a short distance in front of this opening, the current of explosive mixture thus passing through the free air before entering the mould wherein it encounters the heated workpiece and owing to its velocity dropping below the ignition velocity of the gas mixture can be ignited.

While I have shown and described the preferred form of an apparatus for carrying out my invention it may obviously be modified in many ways to suit various conditions of working and I do not desire to be limited to the exact details of procedure and construction shown and described.

I claim:

1. The method of heating work pieces for the purpose of welding, consisting in partly inclosing said work pieces in a mold, projecting a supply of fuel into the mold through an air gap intermediate the mold and the fuel supply nozzle to carry a sufficient quantity of air therewith to support combustion, and causing the mixture to be ignited within said mold.

2. The method of heating work pieces for the purpose of welding, consisting in partly inclosing said work pieces in a mold, passing a supply of fuel through heating means to vaporize the fuel, projecting the fuel thus heated into the mold through a zone of free air at the entrance to the mold to charge the fuel with sufficient air to support combustion, and causing the mixture to be ignited within the mold.

3. The method of welding consisting in partly inclosing said work pieces within a mold, projecting under pressure a supply of fuel into the mold through a zone of free air at the entrance to the mold, causing the mixture to be ignited within the mold, and introducing aluminothermic material into the mold thus heated.

4. The method of heating work pieces for the purpose of welding consisting in partly inclosing said work pieces in a mold, passing a supply of fuel under pressure through a zone of free air and through a mixing chamber in advance of the entrance to the mold, and into the mold at a velocity in excess of the velocity of flame propagation and causing ignition of the mixture within the mold whereby combustion takes place only within said mold.

5. The method of heating workpieces for the purpose of welding, consisting in partly enclosing said workpieces in a mould, introducing a mixture of fuel air and oxygen into said mould and causing said mixture to be ignited within said mould.

6. The method of welding work pieces consisting in partly enclosing said workpieces in a mould, introducing a mixture of fuel air and oxygen into said mould, causing said mixture to be ignited within said mould and introducing aluminothermic material into the mould thus heated.

7. The method of heating workpieces for the purpose of welding, consisting in partly enclosing said workpieces in a mould, introducing a preheated mixture of fuel air and oxygen into said mould and causing said mixture to be ignited within said mould.

8. The method of welding work pieces consisting in partly enclosing said workpieces in a mould, introducing a preheated mixture of fuel air and oxygen into said mould, causing said mixture to be ignited within said mould and introducing aluminothermic material into the mould thus heated.

9. The method of heating workpieces for the purpose of welding, consisting in partly enclosing said workpieces in a mould, introducing a mixture of gaseous and pulverulent mixture and air into said mould and causing said fuel to be ignited within said mould.

10. The method of heating workpieces for the purpose of welding, consisting in partly enclosing said workpieces in a mould, introducing a mixture of gaseous and pulverulent fuel air and oxygen into said mould and causing said mixture to be ignited within said mould.

11. The method of heating workpieces for the purpose of welding, consisting in partly enclosing said workpieces in a mould, introducing a preheated mixture of gaseous and pulverulent fuel air and oxygen into said mould and causing said mixture to be ignited within said mould.

In testimony whereof I affix my signature.

JOHN WATTMANN.